United States Patent
Hanley et al.

(10) Patent No.: US 11,224,109 B2
(45) Date of Patent: Jan. 11, 2022

(54) CONNECTED LIFE SAFETY EMERGENCY LIGHTING SCHEDULER

(71) Applicant: ABL IP Holding LLC, Atlanta, GA (US)

(72) Inventors: Michael G. Hanley, Lawrenceville, GA (US); Kenneth Edwin Nelson, Stone Mountain, GA (US); Emanuel Malandrakis, Boston, MA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/841,826

(22) Filed: Apr. 7, 2020

(65) Prior Publication Data

US 2020/0344866 A1 Oct. 29, 2020

Related U.S. Application Data

(60) Provisional application No. 62/839,899, filed on Apr. 29, 2019.

(51) Int. Cl.
*H05B 47/16* (2020.01)
*H04L 29/08* (2006.01)

(52) U.S. Cl.
CPC ............ *H05B 47/16* (2020.01); *H04L 67/12* (2013.01)

(58) Field of Classification Search
None
See application file for complete search history.

(56) References Cited

U.S. PATENT DOCUMENTS

| | | | |
|---|---|---|---|
| 6,285,132 B1* | 9/2001 | Conley, III | H05B 41/2853 315/86 |
| 6,392,349 B1* | 5/2002 | Crenshaw | H02J 9/02 315/150 |
| 7,848,702 B2 | 12/2010 | Ho et al. | |
| 2002/0080027 A1* | 6/2002 | Conley, III | H05B 47/19 340/540 |
| 2002/0140360 A1* | 10/2002 | Crenshaw | H02J 9/02 315/149 |
| 2005/0057353 A1* | 3/2005 | Barrieau | G08B 7/06 340/506 |
| 2008/0055077 A1* | 3/2008 | Lane | G08B 17/00 340/540 |
| 2018/0042083 A1* | 2/2018 | Couch | H04L 67/10 |
| 2018/0095142 A1* | 4/2018 | Nelson | G01R 31/44 |

* cited by examiner

*Primary Examiner* — Crystal L Hammond
(74) *Attorney, Agent, or Firm* — Kilpatrick Townsend & Stockton LLP

(57) ABSTRACT

A method for testing an emergency lighting product connected to a network includes creating, at a network control device, a first test schedule for causing the emergency lighting product to perform a test, where the test is scheduled to be performed by the emergency lighting product based on a signal received from the network control device after a first time period. The method further includes creating, at the emergency lighting product, a second test schedule for causing the emergency lighting product to perform the test after a second time period, where the second time period is longer than the first time period and begins at the same time as the first time period, and determining, by the emergency lighting product after the second time period, that the signal has not been received from the network control device, and performing, by the emergency lighting product, the test.

20 Claims, 3 Drawing Sheets

CONNECTED LIFE SAFETY EMERGENCY LIGHTING SCHEDULER

CROSS-REFERENCES TO RELATED APPLICATIONS

This application claims the benefit of U.S. Provisional Application No. 62/839,899, filed Apr. 29, 2019, the contents of which are hereby incorporated herein by reference in their entirety.

BACKGROUND

Unless otherwise indicated herein, the materials described in this section are not prior art to the claims in this application and are not admitted to be prior art by inclusion in this section.

Safety standards, such as those defined by Underwriters Laboratories (UL) or the National Fire Protection Association (NFPA), may specify testing requirements for emergency products. Emergency products may include egress lighting fixtures, emergency lighting fixtures, battery backed-up room lighting, exit signs, combination exit sign/emergency lighting units, etc. For emergency lighting products, the testing requirements may include a monthly test to verify emergency operation and an annual test to verify that the fixture has sufficient backup power to operate in an emergency mode for a predefined time period. The duration of the monthly test may be on the order of several minutes and may be run once a month. The duration of the annual test may be longer, on the order of 90 minutes, and may be run once a year.

Individual emergency lighting products may be connected via a network. In some networks, there is a gateway that communicates with the emergency lighting products and manages the testing of the emergency lighting products. The gateway may send a message to an emergency lighting product instructing the unit to conduct the appropriate test and to respond with the results of the test. A failure at the gateway may result in the test not being run as required.

SUMMARY

Apparatuses and methods for scheduling testing of emergency lighting systems are provided.

According to various aspects there is provided a method for performing operational testing for an emergency lighting product connected to a network. In some aspects, the method may include creating, at a network control device, a first test schedule for causing the emergency lighting product to perform a first operational test. The first operational test may be scheduled to be performed by the emergency lighting product based on a first signal received from the network control device after a first time period. The method may further include creating, at the emergency lighting product, a second test schedule for causing the emergency lighting product to perform the first operational test after a second time period. The second time period may have a duration that is longer than the first time period, and may begin at the same time as the first time period. The method may further include determining, by the emergency lighting product after the second time period, that the first signal has not been received from the network control device, and performing, by the emergency lighting product, the first operational test.

According to various aspects there is provided a system. In some aspects, the system may include a set of emergency lighting products and a network control device configured to communicate with the set of emergency lighting products over a network. The network control device configured to implement a first test schedule to schedule the set of emergency lighting products to perform a first operational test, and transmit a first signal to emergency lighting product of the set of emergency lighting products upon expiration of a first time period associated with the first test schedule. Each emergency lighting product of the set of emergency lighting products is configured to, upon failure to receive the first signal from the network control device, perform the first operational test upon expiration of a second time period associated with a second test schedule implemented by each emergency lighting product of the set of emergency lighting products. The second time period may begin at a same time as the first time period and may have a longer duration than the first time period.

According to various aspects there is provided a method. In some aspects, the method may include implementing a first test schedule by a network controller to schedule a set of emergency lighting products to perform a first operational test upon expiration of a first time period associated with the first test schedule, determining, upon expiration of a second time period associated with a second test schedule implemented by each emergency lighting product of the set of emergency lighting products, that the first operational test has not been performed, and performing the first operational test upon expiration of the second time period. The second time period may have a longer duration than the first time period.

Numerous benefits are achieved by way of the various embodiments over conventional techniques. For example, the various embodiments provide methods and systems ensuring that operational testing of emergency lighting systems are performed in the absence of a control signal. In some embodiments, a real time clock in a gateway device is used in conjunction with timers in an emergency lighting product to cause testing of emergency lighting systems to be performed on schedule. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

An emergency light is a battery-backed lighting device that switches on automatically when a building experiences a power outage. Emergency lights, also termed egress lights, are used in buildings as a safety precaution to power outages, so that people will be able to find their way out of a building. Exit signs are often used in conjunction with emergency lighting. The emergency light provides a high-lumen, wide-coverage light that can illuminate an area, for example, a fire exit. An emergency light fixture may have a test button that temporarily overrides the unit and causes it to switch on the lights and operate from battery power even if the main power is still on.

In a network-connected emergency lighting installation, testing of the individual emergency lighting products, for example, but not limited to, egress lighting fixtures, emergency lighting units, battery backed-up room lighting, exit signs, combination exit sign/emergency lighting units, etc., may be controlled by a gateway configured to communicate with the emergency lighting products. The gateway may schedule testing of the emergency lighting products and transmit messages to the emergency lighting products when the scheduled test time arrives. In some situations, for example, failure of a gateway, messages instructing the emergency lighting products to conduct the required tests may not be sent.

According to aspects of the present disclosure, an emergency lighting products monitors the time between tests and may initiate a test if it does not receive a message from the gateway to conduct the test within the expected time period.

Figure 1:
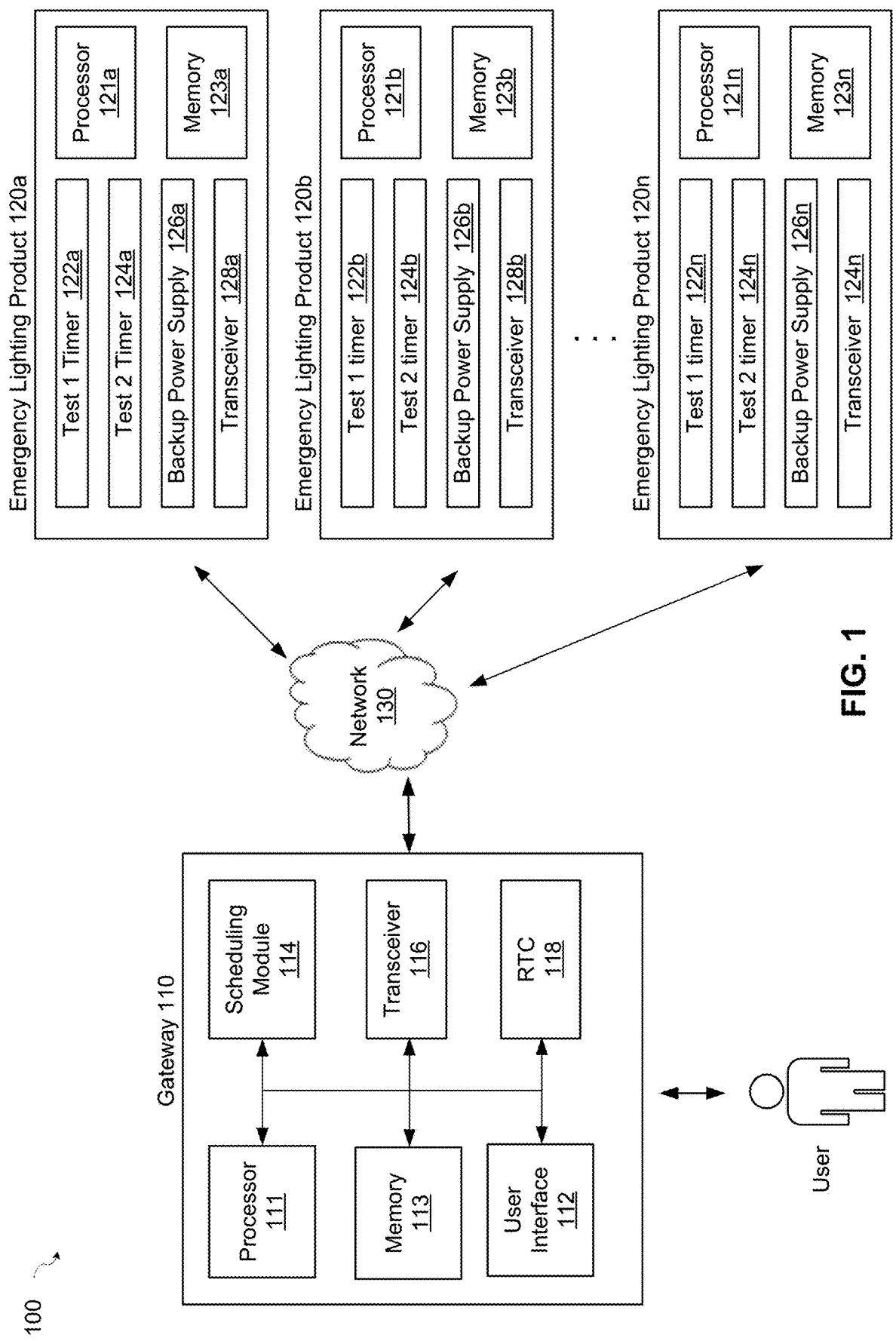
FIG. 1 is a diagram illustrating an example of an emergency lighting system including a gateway and a number of emergency lighting products according to various aspects of the present disclosure.

FIG. 1 is a diagram illustrating an example of an emergency lighting system 100 according to various aspects of the present disclosure. As illustrated in FIG. 1, the emergency lighting system 100 may include a gateway 110 (e.g., a network controller) and a number of emergency lighting products 120a-120n. The gateway 110 and the emergency lighting products 120a-120n may communicate over a network 130. The gateway may include a processor 111, a user interface 112, a scheduling module 114, a transceiver 116, and a real time clock (RTC) 118. The user interface 112 may include any device, component, sensor, or interface, physical or virtual, that can be used to provide input (e.g., buttons, touch-screen interface, keyboard, a pointing/cursor control, microphone, camera, and/or the like).

The scheduling module 114 may be a hardware module, a software module, or a firmware module. The scheduling module 114 may be in communication with the user interface 112 and may receive and store input from the user interface 112 for scheduling emergency lighting product operational tests. For example, the scheduling module 114 may receive and store date and time information from the user interface 112 for various tests (e.g., monthly tests, annual tests, etc.) for groups of emergency lighting products (e.g., emergency lighting products 120a-120n).

The scheduling module 114 may be in communication with the memory 113, the processor 111, and the transceiver 116. When the time tracked by the RTC 118 matches date and time information, the scheduling module 114 may communicate a signal to the processor 111 to cause the transceiver 116 to transmit a signal to the emergency lighting products 120a-120n to conduct an operational test. Alternatively, the scheduling module 114 may communicate a signal to cause the transceiver 116 to transmit a signal to the emergency lighting products 120a-120n to conduct an operational test.

The transceiver 116 may represent one or more components configured to facilitate a network connection, and may include wired or wireless interfaces. The wireless interfaces may include, for example, wireless interfaces such as IEEE 802.11, Bluetooth, or radio interfaces for accessing cellular telephone networks (e.g., transceiver/antenna for accessing a CDMA, GSM, UMTS, or other mobile communications network). Wired interfaces can include interfaces such as Ethernet, USB, IEEE 1394, or a fiber optic interface. Other communications interfaces may be used without departing from the scope of the present disclosure.

The RTC 118 may keep track of the current time. The RTC 118 may derive power from the primary power source of the gateway 110, and may also have an alternate power source, for example, a lithium battery, a capacitor, or a supercapacitor. Accuracy of the RTC 118 may be maintained by a crystal oscillator, synchronization with the power line frequency, digital radio signals, etc.

The memory 113 may be processor-readable solid state storage media, for example, but not limited to, RAM, ROM, EEPROM, FLASH memory, or other solid state storage devices that may be used to store desired program code in the form of instructions or data structures and that may be accessed by or operated upon by the processor 111.

The processor 111 may be a microprocessor, microcomputer, computer, microcontroller, programmable controller, or other programmable device. The processor 111 may be in communication with the user interface 112, the scheduling module 114, the transceiver 116, and the RTC 118. The processor 111 may control overall operation of the gateway 110.

In some implementations, the network 130 may be a wireless network. In some implementations, the network 130 may be a wired network. In other implementations, the network 130 may be a combination of wireless and wired networks.

In one implementation, the gateway 110 may communicate with all of the emergency lighting products in a building. In other implementations, there may be multiple gateways within a building and each gateway may communicate with a subset of the emergency lighting products in the building.

The emergency lighting products 120a-120n may provide egress lighting that remains operational during a loss of power. Lighted exit signs (not shown) may be used in conjunction with emergency egress lighting. Each emergency lighting products 120a-120n may include an illumination source (not shown), a processor 121a-121n, a memory 123a-123n, a backup power supply 126a-126n, and a transceiver 128a-128n. The processor 121a-121n may be a microprocessor, microcomputer, computer, microcontroller, programmable controller, or other programmable device or logic. The memory 123a-123n may be processor-readable solid state storage media, for example, but not limited to, RAM, ROM, EEPROM, FLASH memory, or other solid state storage devices. The transceiver 128a-128n may be similar to the transceiver 116 of the gateway 110. The backup power supply 126a-126n may be a battery that can provide power to the illumination source in cases of power failure.

Each of the emergency lighting products 120a-120n may include one or more timers for each of the scheduled tests. For example, FIG. 1 illustrates emergency lighting products including two timers, a first timer 122a-122c that can be used, for example, to schedule a monthly operational test (Test 1 Timer), and a second timer 124a-124c that can be used, for example, to schedule an annual operational test (Test 2 Timer).

The tests performed by the emergency lighting products 120a-120n may include, but are not limited to, life safety operational tests (e.g., monthly operational tests) and life safety duration tests (e.g., annual operational tests). Life safety operational tests may be scheduled on an approximately monthly basis or according to another time period. The life safety operational tests may be abbreviated tests during which the emergency lighting products 120a-120n may operate for a short period of time, for example, five minutes or another period of time. Safety standards, such as those defined by UL or the NFPA, may specify the testing requirements and duration for the life safety operational tests.

The life safety duration tests may be scheduled on an approximately monthly basis or according to another time period. The life safety duration tests may be operational tests during which the emergency lighting products 120a-120n may operate for the full duration of specified operation, for example, 90 minutes or another period of time. Safety standards, such as those defined by UL or the NFPA, may also specify the testing requirements and duration for the life safety duration tests. The life safety duration test requires that the backup power supply of the emergency lighting products be fully charged to perform the test.

In cases where the backup power supply for an emergency lighting products is not fully charged, the processor 111 of the gateway 110 may prevent a test signal from being sent to the emergency lighting products to perform the life safety duration test, or the processor 121a-121n of the emergency lighting products may prevent the emergency lighting products from performing the life safety duration test. In either case, the processor 111 of the gateway 110 may generate a notification, for example, to the user interface 112, that one or more emergency lighting products 120a-120n are unable to perform the life safety duration test.

While life safety operational tests and life safety duration tests have been described, it should be appreciated that other tests may be performed and other time periods may be specified without departing from the scope of the present disclosure.

In some implementations, the emergency lighting products may periodically communicate status information to the gateway. Some of the status information may be relevant to the operation of a test, such as information about a battery level. A test, such as the annual test, may require a minimum battery level before the test is started.

The user interface 112 may allow a user to configure the scheduling module 114, to run a manual test, or to obtain testing data. The testing data may include information about the times that each emergency lighting product 120a-120n was tested and the outcome of each test. If an emergency lighting product 120a-120n failed the test, the testing data may identify the unit that failed, and provide information about the failure. For example, the testing data may indicate that the battery of emergency lighting product 120a needs to be replaced or that the light engine of emergency lighting product 120b needs to be replaced.

According to some aspects of the present disclosure, test schedules for the emergency lighting products 120a-120n may be maintained by the gateway 110 and by each emergency lighting product 120a-120n. The test schedules for both the life safety operational tests and life safety duration tests may be programmed in the gateway 110. For example, a user may enter test schedules via the user interface 112.

The test schedules may specify dates and times for groups of emergency lighting products 120a-120n to perform specified tests. The test schedules may be received and stored by the scheduling module 114. The scheduling module 114 may then monitor the date and time tracked by the RTC 118 and, at a scheduled data and time, cause the processor 111 or transceiver 116 of the gateway to transmit a signal to the emergency lighting products 120a-120n to perform specified test.

The timers, for example the test 1 timers 122a-122n and the test 2 timers 124a-124n in the emergency lighting products 120a-120n may be programmed for time intervals after which specified tests should be performed. For example, the test 1 timers 122a-122n may be programmed to perform life safety operational tests after a first interval of time and the test 2 timers 124a-124n may be programmed to perform life safety duration tests after a second interval of time. The time intervals may be preprogrammed, or may be provided or updated during operation by a software or firmware upgrade to the emergency lighting products 120a-120n.

The time intervals for performing tests that are set in the timers test 1 timers 122a-122n and the test 2 timers 124a-124n in the emergency lighting products 120a-120n may be longer than the time intervals for performing tests that are programmed in the scheduling module 114 of the gateway 110. As an example, the scheduling module 114 of the gateway 110 may be programmed to cause the emergency lighting products 120a-120n to perform life safety operational tests on dates that are 28 days apart and to perform life safety duration tests on dates that are 360 days apart. The time intervals for performing life safety operational tests may be set to every 30 days for the test 1 timers 122a-122n in the emergency lighting products 120a-120n and the time intervals for performing may life safety duration tests be set to every 364 days for the test 2 timers 124a-124n in the emergency lighting products 120a-120n.

Continuing with the above example, at the date that is 28 days later than the previous life safety operational test (or 360 days later than the previous life safety duration test), the gateway 110 may transmit signals to the emergency lighting products 120a-120n to perform another life safety operational test (or another life safety duration test). The emergency lighting products 120a-120n may receive the signal from the gateway 110, perform the life safety operational test (or life safety duration test), and transmit status messages to the gateway 110 based on the results of the test. The signal received from the gateway 110 may also cause the test 1 timers 122a-122n to be reset to time the next 30 day interval (or the test 2 timers 124a-124n to be reset to time the next to the next 364 day interval).

In some cases, the emergency lighting products 120a-120n may not receive the signal from the gateway 110. For example, a problem with the gateway 110 or other network communication problem may prevent the signal to perform the test from being received by the emergency lighting products 120a-120n. In such cases, the time duration from the previous life safety operational test may reach the 30 day duration set by the test 1 timers 122a-122n (or the time duration from the previous life safety duration test may reach the 364 day duration set by the test 2 timers 124a-124n). The processors 121a-121n of the emergency lighting products 120a-120n may determine that the signal has not been received from the gateway 110 and the life safety operational test (or life safety duration test) has not been performed. The processors 121a-121n of the emergency lighting products 120a-120n may initiate the life safety operational test (or the life safety duration test) and cause the results of the test to be stored in the memories 123a-123n. The processors 121a-121n of the emergency lighting products 120a-120n may also cause the test 1 timers 122a-122n to be reset to time the next 30 day interval (or the test 2 timers 124a-124n to be reset to time the next 364 day interval). When communication with the gateway 110 is restored, the processors 121a-121n of the emergency lighting products 120a-120n may cause status messages to be transmitted to the gateway 110.

When communication is restored, the gateway 110 may receive the status messages from the emergency lighting products 120a-120n. In some cases, the scheduling module 114 of the gateway 110 may determine that the scheduled date for performing the life safety operational test has passed, and the gateway 110 may store the status messages and may generate notifications of any reported anomalies from the status messages. The scheduling module 114 may continue to monitor the RTC 118 for the next date and time to perform a life safety operational test. In some cases, when communication is restored, scheduling module 114 of the gateway 110 may determine that the scheduled date for performing the life safety operational test has passed and may generate a signal to the emergency lighting products 120a-120n to perform the life safety operational test. Upon receiving the signal from the gateway 110, the emergency lighting products 120a-120n may perform another life safety operational test (or another life safety duration test) and transmit status messages to be transmitted to the gateway 110 based on the results of the test. The signal received from the gateway 110 may also cause the test 1 timers 122a-122n to be reset to time the next 30 day interval (or the test 2 timers 124a-124n to be reset to time the next 364 day interval. The scheduling module 114 of the gateway 110 may continue to monitor the RTC 118 for the next programmed date and time to perform a life safety operational test.

While a wireless network is illustrated in FIG. 1, it should be appreciated that embodiments of the present disclosure may be implemented with a wired network or a combination of wired and wireless networks without departing from the scope of the present disclosure.

Figure 2:
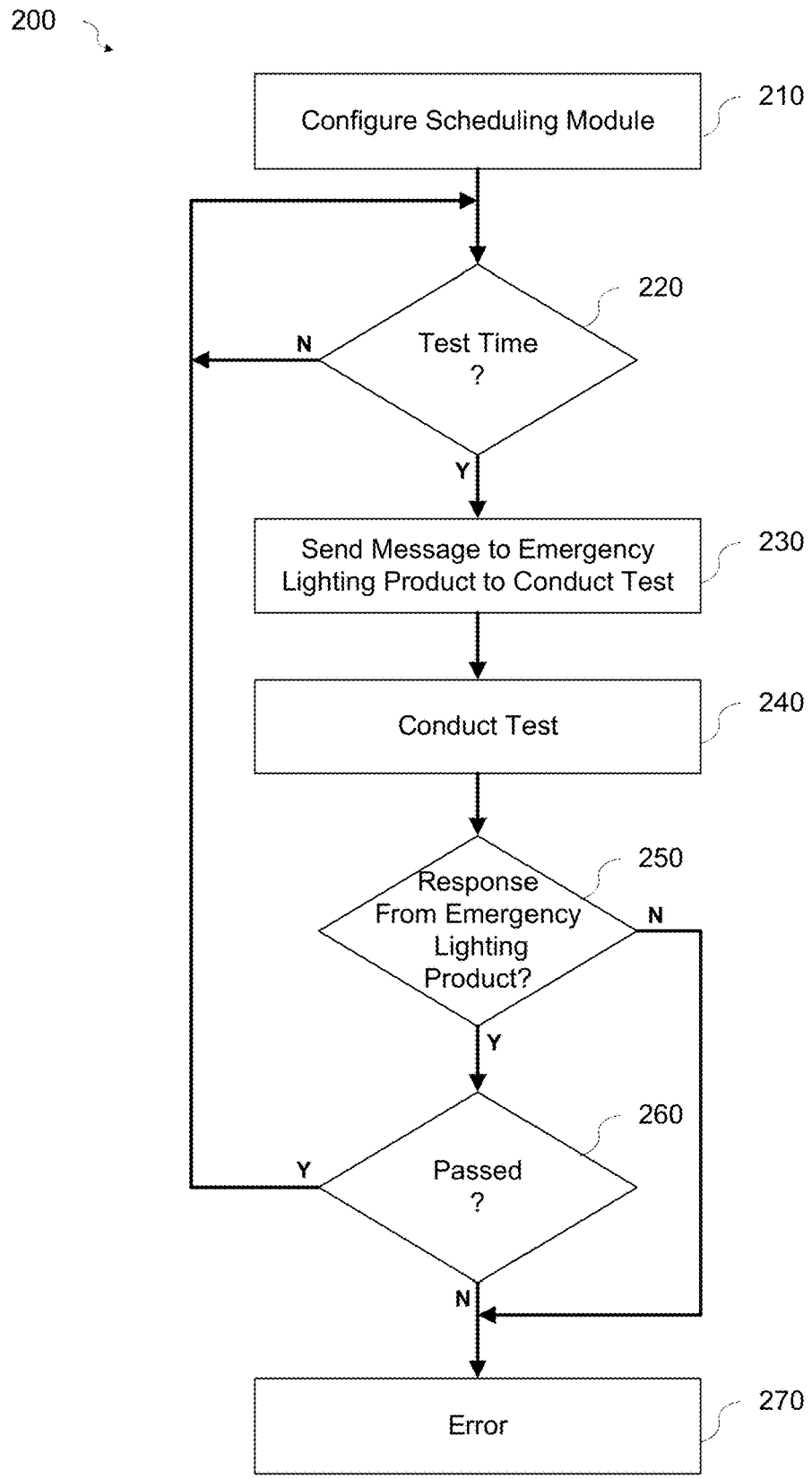
FIG. 2 is a flowchart illustrating an example of a method for the operation of the gateway according to various aspects of the present disclosure.

FIG. 2 is a flowchart illustrating an example of a method 200 for the operation of the gateway according to various aspects of the present disclosure. At block 210, the scheduling module may be configured. For example, the scheduling module 114 in the gateway 110 may be configured to schedule the times for the emergency lighting products (e.g., emergency lighting products 120a-120n) to run tests, for example, monthly tests and annual tests. The monthly test may be scheduled for a certain day and time of the month and the annual test may be scheduled for a certain day and time of the year.

The scheduling module 114 may be configured to use dates to schedule the tests. For example, the scheduling module 114 may be configured to run a monthly test on the first Sunday of the month or the 15th of the month, and the 100th day of the year or August 1st for the annual test. Alternatively, the schedule may use intervals, e.g., every 25 days for the monthly test and every 350 days for the annual test, or any other appropriate scheduling parameters. The scheduling module 114 may be configured by a user or by a server. Alternatively, the scheduling module 114 may be configured during manufacture or installation.

At block 220, it may be determined whether the scheduled time to run a test has arrived. The RTC 118 in the gateway 110 may be used to determine when to initiate each test. For example, the scheduling module 114 may determine that the current time as indicated by the RTC 118 corresponds to the scheduled test time configured in the scheduling module 114. In response to determining that the scheduled test time has not arrived (220—N), the method may continue at block 220 to monitor for the configured test time.

In response to determining that the scheduled test time has arrived (220—Y), at block 230, a message may be sent to one or more emergency lighting products (e.g., emergency lighting products 120a-120n) to conduct a test. The processor 111 of the gateway 110 may cause the transceiver 116 to send a message to the one or more emergency lighting products to conduct the test. The transceiver 116 of the gateway 110 may send the message as a broadcast message to all the emergency lighting products, as a multicast message to some of the emergency lighting products, or as a unicast message to one of the emergency lighting products.

In some situations, the gateway 110 may determine whether any preconditions have been met prior to sending the message to conduct the test. One example of a precondition is battery status of an emergency lighting product. The emergency lighting products may periodically send status messages, including the status of the battery, to the gateway. Based on the status messages, a status of each emergency lighting product in communication with the gateway 110 may be maintained. For example, the processor 111 may cause various status indications of the emergency lighting products to be stored in the memory 113. If the emergency lighting product previously sent a message to the gateway indicating that its battery level is low, the gateway may not send a message to the emergency lighting product to conduct an annual test until the battery level exceeds a certain threshold (e.g., the battery is replaced). Similarly, if the emergency lighting product previously sent a message to the gateway indicating another fault condition, the gateway may not send a message to the emergency lighting product to conduct a test until the fault condition has been corrected as indicated by a status message from the emergency lighting product. The gateway 110 may generate a notification, for example, by displaying a message on the user interface, to a fault at a particular emergency lighting product.

At block 240, the emergency lighting products may conduct the test. The one or more emergency lighting products (e.g., emergency lighting products 120a-120n) may receive the message from the gateway 110 to conduct the test. For example, the message from the gateway may instruct the one or more emergency lighting products to conduct a life safety operational test (e.g., a monthly test) or a life safety duration test (e.g., an annual test). Other types of test may be performed by the emergency lighting products without departing from the scope of the present disclosure.

In some implementations, the test procedures for various tests may be pre-programmed into the emergency lighting products. For example, the emergency lighting product may contain a processor and a memory. The memory may include instructions executable by the processor for performing a test when a message is received from the gateway 110 to perform the test. In some implementations, the gateway 110 may provide instructions for performing the test to the processor of the emergency lighting product. The emergency lighting products may return test data to the gateway 110. In some implementations, the emergency lighting products may return test data to the gateway 110 as individual portions of the test are completed. In some implementations, the emergency lighting products may return test data to the gateway 110 after the entire test is completed.

At block 250, it may be determined whether a response was received from the emergency lighting products within a predetermined amount of time. The processor 111 of the gateway 110 may monitor for test data being returned from each of the emergency lighting products the gateway 110 expects to receive data from. In response to determining that a response was not received from the emergency lighting product within the predetermined amount of time (block 250—N), at block 270, the gateway 110 may perform error processing. For example, in some implementations, the gateway 110 may send a message to the emergency lighting product to shut down. In some implementations, the gateway 110 may also provide a notification to a user or otherwise provide an indication that a failure of an emergency lighting product was detected (e.g., no response was received).

When the gateway 110 receives a message with test data from an emergency lighting product within the predetermined amount of time (block 250—Y), at block 260, it may be determined whether the emergency lighting product passed the test that was conducted. The processor 111 of the gateway may cause the test data to be stored in the memory (e.g., the memory 113), for example in a data structure associated with the emergency lighting product that reported the test data. The processor 111 may process the test data received from the emergency lighting product to determine whether the emergency lighting product passed the test that was conducted.

In response to determining that the emergency lighting product passed the test (block 260—Y), the method may continue at block 220 to monitor for the next configured test time.

In response to determining that the emergency lighting product did not pass the test (block 260—N), at block 270, the gateway 110 may perform error processing. The test may continue until all sub-tests, for example, but not limited to, battery capacity, lighting element condition, etc., of the scheduled test have been performed. In some implementations, as a result of a test failure the gateway 110 may send a message to the emergency lighting product to shut down after completion of the test. In some implementations, the gateway 110 may also provide a notification to a user or otherwise provide an indication that a failure of an emergency lighting product was detected.

In some cases, failures may be cleared manually (e.g., pressing a reset button, replacing a lighting element, etc.). In some cases, failures may be cleared by the gateway (e.g., performing a recalibration routine for the emergency lighting product, transmitting a manually entered command, etc.).

It should be appreciated that the specific steps illustrated in FIG. 2 provide a particular method for operation of a gateway according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
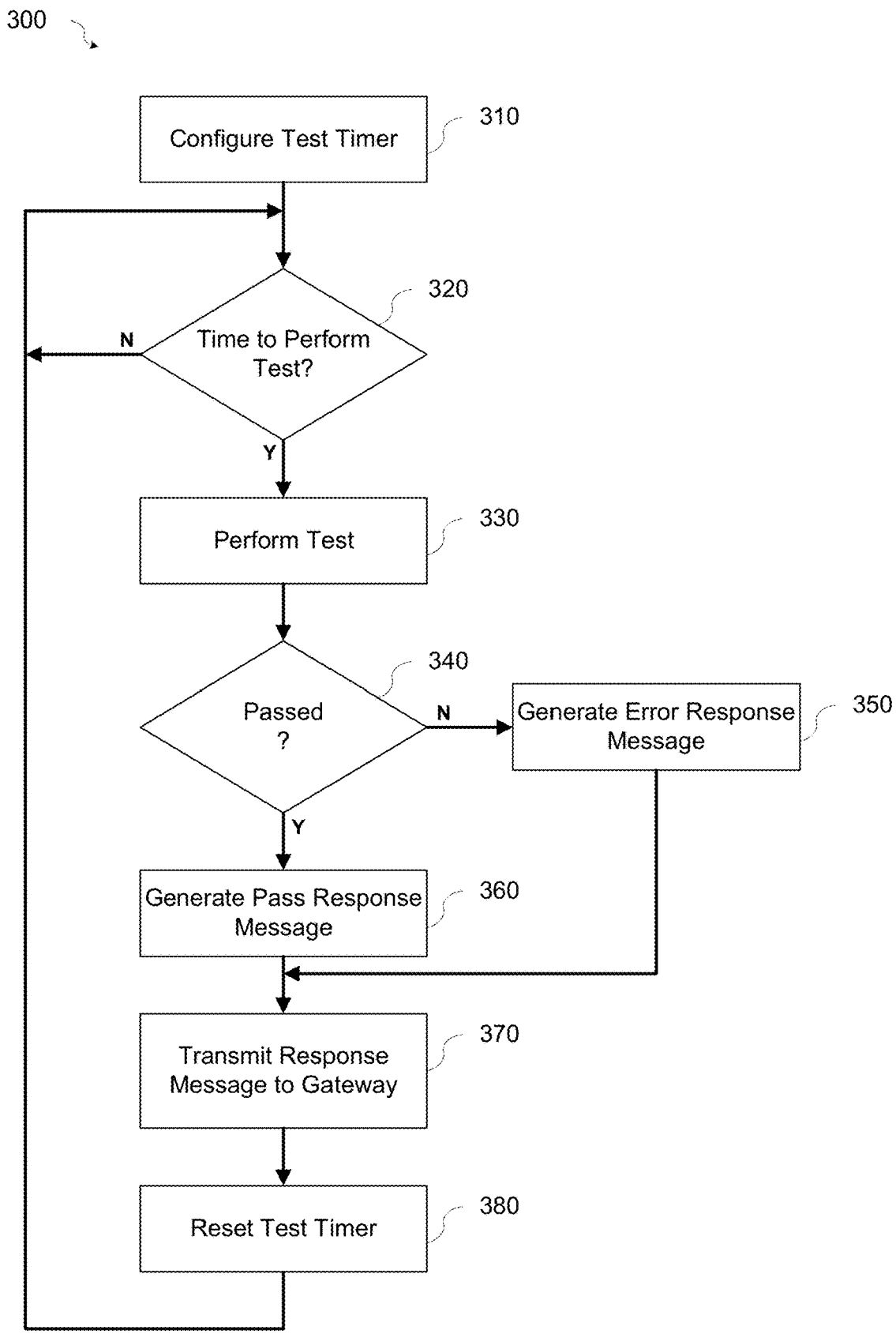
FIG. 3 is a flowchart illustrating an example of a method for the operation of the emergency lighting products according to various aspects of the present disclosure.

FIG. 3 is a flowchart illustrating an example of a method 300 for the operation of the emergency lighting product 120a-120n according to various aspects of the present disclosure. Referring to FIG. 3, at block 310, a test timer in the emergency lighting product may be configured. The emergency lighting product 120a-120n may include one or more timers (e.g., timers 122a-122n or 124a-124n) that may be configured to measure time intervals between test operations. A specified test, for example, a life safety operation test, may be scheduled to be performed at repeated predetermined intervals of time. A timer in the emergency lighting product may be configured to measure the time intervals between tests. The timer may provide a signal to a processor (e.g., processor 121a-121n) of the emergency lighting product upon expiration of the time interval.

At block 320, it may be determined whether a time to conduct a test has been reached. A time to conduct the test may be indicated by a signal from a network controller (e.g., the gateway 110) received by the emergency lighting product or may be indicated by the expiration of a timer in the emergency lighting product. The time interval measured by the timer may be longer than a time interval at which signals are received from the network controller. Therefore, if the emergency lighting product does not receive a signal to perform a test from the network controller, the emergency lighting product to may perform the test upon expiration of the timer.

In response to determining that a message has not been received from the network controller or the time interval measured by the timer has not expired (320—N), the processor of the emergency lighting product may continue to monitor for the signal from the network controller to run the test or the expiration of the time interval.

In response to determining that a message has been received from the network controller or the time interval measured by the timer has expired (320—Y), at block 330, the emergency lighting product may perform the specified test. Different tests may be specified to be performed at different time intervals. For example, a life safety operational test may be scheduled to be performed at approximately monthly intervals, while a life safety duration test may be scheduled to be performed at approximately annual intervals. Other tests may be scheduled to be performed at different intervals without departing from the scope of the present disclosure. In some cases, the scheduled test may not be performed when a signal is received from the network controller or when the time interval expires. For example, processor of the emergency lighting product may determine that a battery of the emergency lighting product does not have sufficient charge to perform the required test and may prevent the test from being performed.

At block 340, it may be determined whether the emergency lighting product passed the scheduled test. The processor of the emergency lighting product may determine whether the emergency lighting products successfully performed the scheduled test or whether fault conditions exist. For example, the processor of the emergency lighting product may determine whether the emergency lighting product was capable of maintaining appropriate illumination during a life safety duration test. The processor of the emergency lighting product may cause test results to be stored in a memory (e.g., memory 123a-123n) of the emergency lighting product.

In response to determining that the emergency lighting product did not pass the scheduled test (340—N), at block 350, an error response message may be generated. The test may continue until all sub-tests, for example, but not limited to, battery capacity, lighting element condition, etc., of the scheduled test have been performed. Test failures may be latched by the emergency lighting product. For example, the test failures may be stored in the memory of the emergency lighting product until they are cleared. In some implementations, a failure log may be maintained for a specified period of time. For example, test failures may be stored in a database maintained in a memory of the emergency lighting product for five years of another period of time. An emergency lighting product may transmit the contents of the database to the gateway upon a request received from the gateway. In some implementations, the contents of the database may be transmitted by the emergency lighting product at predetermined time intervals (e.g., days, weeks, months).

Upon completion of the scheduled test, the processor of the emergency lighting product may cause an error response message to be generated. The response message may include a list of components identified as contributing to the test failure. In some cases, failures may be cleared manually (e.g., pressing a reset button, replacing a lighting element, etc.). In some cases, failures may be cleared by the gateway (e.g., performing a recalibration routine for the emergency lighting product, transmitting a manually entered command, etc.).

In response to determining that the emergency lighting product passed the scheduled test (340—Y), at block 360, a passing response message may be generated. The processor of the emergency lighting product may cause a passing response message to be generated. The passing response message may include a status of various elements of the emergency lighting product, for example, but not limited to, battery condition.

At block 370, the response message may be transmitted to the network controller. The network controller may be a gateway. The response message may include data related to status of the emergency lighting product, for example, but not limited to, data related to passing and/or failing conditions of various elements of the emergency lighting product.

At block 380, the test timer may be reset. After a test has been performed, either as a result of a signal from the network controller or expiration of a specified time interval, the processor may cause the test timer to be reset to the specified time interval for the next scheduled test. The process may continue at block 320, and the time for the next scheduled test may be monitored.

It should be appreciated that the specific steps illustrated in FIG. 3 provide a particular method for operation of an emergency lighting product according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. For example, although an implementation using lighting fixtures has been used for illustration, the invention may be extended to any type of emergency products and any type of test or test schedule.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for performing operational testing for an emergency lighting product connected to a network, the method comprising:
   creating, at a network control device, a first test schedule for causing the emergency lighting product to perform a first operational test, wherein the first operational test is scheduled to be performed by the emergency lighting product based on a first signal received from the network control device after a first time period;
   creating, at the emergency lighting product, a second test schedule for causing the emergency lighting product to perform the first operational test after a second time period, the second time period having a longer duration than the first time period;
   determining, by the emergency lighting product after the second time period, that the first signal has not been received from the network control device; and
   performing, by the emergency lighting product, the first operational test.

2. The method of claim 1, further comprising:
   transmitting to the network control device via the network, by the emergency lighting product, data related to an operational status of the emergency lighting product based on results of the first operational test.

3. The method of claim 1, further comprising:
   resetting, by the emergency lighting product, a beginning time for a next second time period after performing the first operational test.

4. The method of claim 1, further comprising:
   receiving, by the emergency lighting product, the first signal from the network control device after performing the first operational test; and
   resetting a time for the second time period to begin based on receiving the first signal from the network control device.

5. The method of claim 1, further comprising:
   creating, at the network control device, a third test schedule for causing the emergency lighting product to perform a second operational test after a third time period, wherein the second operational test is scheduled to be performed by the emergency lighting product based on a second signal received from the network control device after the third time period;
   creating, at the emergency lighting product, a fourth test schedule for causing the emergency lighting product to perform the second operational test after a fourth time period, the fourth time period having a longer duration than the third time period;
   determining, by the emergency lighting product after the fourth time period, that the second signal has not been received from the network control device; and
   performing, by the emergency lighting product, the second operational test,
   wherein the second operational test is different than the first operational test.

6. The method of claim 5, further comprising:
   transmitting to the network control device via the network, by the emergency lighting product, data related to an operational status of the emergency lighting product based on results of the second operational test.

7. A system comprising:
a set of emergency lighting products; and
a network control device configured to communicate with the set of emergency lighting products over a network, the network control device configured to:
implement a first test schedule to schedule the set of emergency lighting products to perform a first operational test; and
transmit a first signal to each emergency lighting product of the set of emergency lighting products upon expiration of a first time period associated with the first test schedule;
wherein each emergency lighting product of the set of emergency lighting products is configured to:
upon failure to receive the first signal from the network control device, perform the first operational test upon expiration of a second time period associated with a second test schedule implemented by each emergency lighting product of the set of emergency lighting products, wherein the second time period has a longer duration than the first time period.

8. The system of claim 7, wherein each emergency lighting product is further configured to transmit to the network control device via the network, data related to an operational status of the emergency lighting product based on results of the first operational test.

9. The system of claim 7, wherein the network control device is further configured to:
implement a third test schedule to schedule the set of emergency lighting products to perform a second operational test,
transmit a second signal to each emergency lighting product of the set of emergency lighting products to perform the second operational test upon expiration of a third time period associated with the third test schedule, the third time period having a longer duration than the first time period and the second time period,
wherein the second operational test is different than the first operational test.

10. The system of claim 9, wherein:
the network control device further comprises a real-time clock, wherein the real-time clock is configured to track current time, and
wherein the first time period for the first test schedule and the third time period for the third test schedule are determined based on the current time tracked by the real-time clock.

11. The system of claim 10, wherein the first time period for the first test schedule and the third time period for the third test schedule are programmed in the network control device via a user interface.

12. The system of claim 9, wherein each emergency lighting product is further configured to:
upon failure to receive the second signal from the network control device, perform the second operational test upon expiration of a fourth time period associated with a fourth test schedule implemented by each emergency lighting product of the set of emergency lighting products,
wherein the fourth time period has a longer duration than the third time period.

13. The system of claim 12, wherein each emergency lighting product is further configured to transmit to the network control device via the network, data related to an operational status of the emergency lighting product based on results of the second operational test.

14. The system of claim 12, wherein each emergency lighting product further comprises:
a first timer and a second timer,
wherein the first timer is configured to time the second time period associated with the second test schedule and the second timer is configured to time the fourth time period associated with the fourth test schedule, the fourth time period having a longer duration than the third time period.

15. The system of claim 12, wherein
each emergency lighting product is further configured to:
upon completion of the first operational test, transmit to the network control device via the network, data related to an operational status of the emergency lighting product based on results of the first operational test.

16. The system of claim 7, wherein each emergency lighting product is further configured to:
reset a timer to time a next second time period after performing the first operational test.

17. The system of claim 7, wherein each emergency lighting product is further configured to:
receive the first signal from the network control device after performing the first operational test; and
reset a timer to begin a next second time period on receipt the first signal from the network control device.

18. A method, comprising:
implementing a first test schedule by a network controller to schedule a set of emergency lighting products to perform a first operational test upon expiration of a first time period associated with the first test schedule;
determining, upon expiration of a second time period associated with a second test schedule implemented by each emergency lighting product of the set of emergency lighting products, that the first operational test has not been performed; and
performing the first operational test upon expiration of the second time period wherein the second time period has a longer duration than the first time period.

19. The method of claim 18, further comprising:
implementing a third test schedule by the network controller to schedule the set of emergency lighting products to perform a second operational test upon expiration of a third time period associated with the third test schedule, the third time period having a longer duration than the first time period, wherein the second operational test is different than the first operational test;
determining upon expiration of a fourth time period associated with a fourth test schedule implemented by each emergency lighting product of the set of emergency lighting products, that the second operational test has not been performed; and
performing the second operational test upon expiration of the fourth time period wherein the fourth time period has a longer duration than the third time period.

20. The method of claim 19, further comprising:
upon completion of each operational test, each emergency lighting product is further configured to transmit to the network controller, data related to an operational status based on results of each operational test.

* * * * *